United States Patent [19]

Sarurai et al.

[11] 4,432,260
[45] Feb. 21, 1984

[54] METHOD AND APPARATUS FOR CONTROLLING THE FEEDING OF A BANDSAW BLADE OF HORIZONTAL BANDSAW MACHINES

[75] Inventors: Nobuo Sarurai, Yokohama; Morimasa Kobayashi, Isehara, both of Japan

[73] Assignee: Amada Company, Limited, Isehara, Japan

[21] Appl. No.: 158,256

[22] Filed: Jun. 10, 1980

[30] Foreign Application Priority Data

Jun. 11, 1979 [JP] Japan .................................. 54-72222
Jun. 11, 1979 [JP] Japan .................................. 54-72223

[51] Int. Cl.$^3$ ............................................. B23D 55/08
[52] U.S. Cl. ............................................. 83/13; 83/800; 83/801; 83/72
[58] Field of Search ............. 83/800, 801, 794, 454, 83/72, 796, 13

[56] References Cited

U.S. PATENT DOCUMENTS

| | | | |
|---|---|---|---|
| 3,752,022 | 8/1973 | Demurger | 83/801 X |
| 3,875,839 | 4/1975 | Aizawa | 83/801 X |
| 4,170,915 | 10/1979 | Sato | 83/800 |
| 4,357,848 | 11/1982 | Sakurai et al. | 83/801 |

*Primary Examiner*—Donald B. Schran
*Attorney, Agent, or Firm*—Thompson, Birch, Gauthier & Samuels

[57] ABSTRACT

A method and apparatus for controlling the feeding of a bandsaw blade in a horizontal bandsaw machine so that the bandsaw blade operates at a uniform optimum cutting rate. The cutting rate of the bandsaw blade is maintained constant by controlling the feeding speed of the blade into material being cut as a function of (1) the cross-sectional cut length at a time interval and (2) the feeding position of the bandsaw blade into the material.

4 Claims, 6 Drawing Figures

METHOD AND APPARATUS FOR CONTROLLING THE FEEDING OF A BANDSAW BLADE OF HORIZONTAL BANDSAW MACHINES

BACKGROUND OF THE INVENTION

1. Field of the Invention

The present invention relates generally to horizontal bandsaw machines in which a saw head assembly carrying a bandsaw blade is lowered during a cutting operation in order to feed the bandsaw blade into an underlying material to be cut, and more particularly pertains to methods and apparatus for controlling the feeding of the bandsaw blade in horizontal bandsaw machines.

2. Description of the Prior Art

Horizontal bandsaw machines conventionally comprise a saw head assembly in which a flexible endless bandsaw blade is trained around a pair of wheels so that it may perform cutting operations when the wheels are driven. The saw head assembly is so arranged as to be raised and lowered with respect to an underlying base supporting the material to be cut. This movement can occur around a hinge pin or along a single or plural guide posts in response to operation of a driving means such as a hydraulic motor. Thus, in cutting operations, the saw head assembly is lowered from the raised position toward the base so as to feed the driven bandsaw blade into the material to be cut which has been placed on the base. Also, in most prevailing horizontal bandsaw machines, the saw head assembly is so arranged as to be raised by a hydraulic motor of a cylinder type when the hydraulic fluid is supplied thereinto and to be lowered by its own gravity when the hydraulic fluid is drained from the hydraulic motor. In this connection, it is desired that the upper limit of the up-and-down movement of the bandsaw blade is made a certain distance above the top of the material to be cut so as to prevent the bandsaw blade from being damaged by the material being fed, since most of materials are not exactly straight.

In such horizontal bandsaw machines, it is desired to feed the bandsaw blade into the material to be cut so that the cutting action is performed always at a certain stated or constant optimum cutting rate which is defined as the area (square millimeter) of cut per unit of time. Since many materials such as round bars and shape steels vary in cross-sectional length as cutting progresses therethrough, it is necessary to feed the bandsaw blade in correlation with this varying cross-sectional length of the material being cut so as to enable the bandsaw blade to operate continuously at an optimum cutting rate. Of course, if the bandsaw blade is not fed at an optimum cutting rate, it will work too hard and will become worn prematurely or otherwise it will work inefficiently.

For the purpose of performing cutting operations at a stated cutting rate according to the cross-sectional length of the material being cut, the bandsaw blade is conventionally arranged to be fed with a constant load or feeding force under the so-called load control or pressure control. In order to maintain the load or feeding force constant under the load control, the pressure of the hydraulic motor for the saw head assembly is controlled while the saw head assembly is lowered to feed the bandsaw blade into the material to be cut. The load control is intended to maintain the cutting resistance constant so as to feed the bandsaw blade at a constant cutting rate, since the cutting rate is generally proportional to the cutting resistance. Thus, under the conventional load control, the feeding speed of the bandsaw blade is controlled as a function of the cross-sectional cut length of the material in order to maintain a constant cutting resistance, while the driven speed of the bandsaw blade is kept unchanged.

The conventional load control, however, is defective especially in that it is based on the premise that the cutting resistance per unit of feeding amount or feeding speed of the bandsaw blade is always stated or constant. In fact, the cutting resistance per unit of feeding amount of the bandsaw blade has a tendency to increase as the feeding amount decreases. Accordingly, when the feeding amount is decreased in order to maintain the cutting resistance constant to respond to an increase of the cross-sectional length of the material being cut for instance, the cutting resistance per unit of feeding amount will have a tendency to further increase. The cutting resistance per unit of feeding amount will markedly increase, especially when cutting difficult-to-cut materials such as stainless steels which have to be cut at a low feeding speed or by a small feeding amount. Thus, the difficult-to-cut materials can be not cut at a uniform optimum cutting rate by the conventional load control in the horizontal machine, although the easy-to-cut materials which can be cut at a higher feeding speed or by a larger feeding amount can be cut at a substantially uniform cutting rate under the conventional load control.

Furthermore, the conventional load control has been also defective in that it is based on the premise that the cutting resistance will increase or decrease only in response to changes in the cross-sectional length of the material being cut. However, the fact is that the cutting resistance will increase as the bandsaw blade becomes worn regardless of the cross-sectional length of the material being cut. Thus, as the wear of the bandsaw blade increases during cutting operations under the conventional load control, the feeding speed of the bandsaw blade will decrease without any increase of the cross-sectional length of the material being cut with the result that the cutting rate will decrease.

In addition to the above, it is desired in horizontal bandsaw machines that the bandsaw blade be brought into contact with the material to be cut in the shortest idle time possible and then fed into the material at a constant optimum cutting rate, since the bandsaw blade is raised a certain distance above the top of the material as has been described hereinbefore.

SUMMARY OF THE INVENTION

It is a primary object of the present invention to provide methods and apparatus for controlling the feeding of the bandsaw blade in horizontal bandsaw machines so that the bandsaw blade is fed always at a stated or constant optimum cutting rate in correlation with the cross-sectional cut length of the material being cut regardless of the nature of the material and the wear of the bandsaw blade.

It is another object of the present invention to provide methods and apparatus for controlling the feeding of the bandsaw blade in horizontal bandsaw machines whereby the cutting efficiency is remarkably increased.

It is a further object of the present invention to provide methods and apparatus for controlling the feeding of the bandsaw blade in horizontal bandsaw machines whereby the life of the bandsaw blade is remarkably lengthened.

Basically, these objects are accomplished by numerically controlling the position of the bandsaw blade being fed into the material to be cut or the feeding speed of the bandsaw blade.

It is a still further object of the present invention to provide methods and apparatus for controlling the feeding of the bandsaw blade in horizontal bandsaw machines so that the bandsaw blade is brought into contact with the material to be cut in the shortest idle time possible and then fed into the material at a constant optimum cutting rate.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
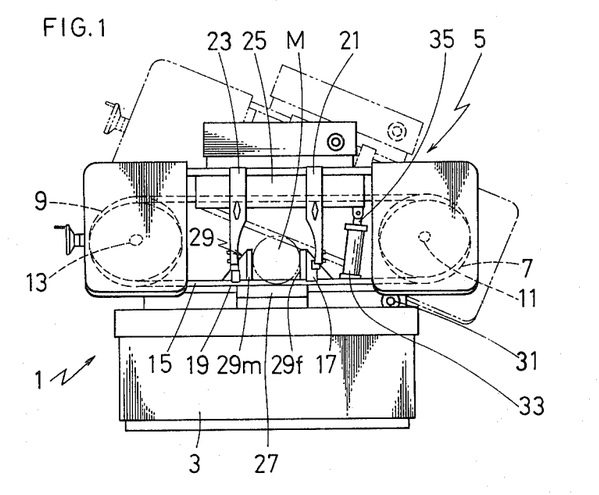
FIG. 1 is a front elevational view of a horizontal bandsaw machine in which the principles of the present invention are embodied.

Referring now to FIG. 1, there is shown a horizontal bandsaw machine which is generally designated by the numeral 1 and comprises a box-like base 3 and a saw head assembly 5 which is movable toward and away from the base 3 as is conventional. The saw head assembly 5 includes a driving wheel 7 and a driven wheel 9 having shafts 11 and 13, respectively, around which an endless bandsaw blade 15 is trained so that it may be driven to make a cutting action when the driving wheel 7 is driven. The bandsaw blade 15 is slidably held or guided with its cutting edge faced downwardly by a pair of guide assemblies 17 and 19 fixed to guide arms 21 and 23, respectively, which are adjustably held by a beam member 25 fixed at the upper portion of the saw head assembly 5. A work-table 27 is mounted on the base 3 so that a material M to be cut may be placed thereon, and a vise assembly 29 having a fixed jaw 29f and a movable jaw 29m is also mounted on the base 3 to hold the material M to be cut therebetween. Also, the saw head assembly 5 is pivotally connected to the base 3 by means of a hinge pin 31 and arranged to be raised and lowered relative to the base 3 by a hydraulic motor 33 of a cylinder type having a piston and rod 35. However, the saw head assembly 5 can be so arranged as to be vertically raised and lowered relative to the base 3 along a vertical guide post or vertical guide posts by a hydraulic motor or other means, as will be disclosed hereinafter.

In the above described arrangements, when the saw head assembly 5 is lowered from its raised position shown by the imaginary lines in FIG. 1, the bandsaw blade 15, which is rotating around the driving and driven wheels 7 and 9 in the saw head assembly 5, will be fed into the material M to be cut, the material M being held by the vise assembly 29 on the work-table 27.

Also, the material M to be cut, which is shown as a round bar in FIG. 1, is horizonally fed on the work-table 27 into the cutting position after the bandsaw blade 15 has been raised by the saw head assembly 5 to its upper limit on completion of each cutting cycle. Generally, the material M is fed forwardly from the backside of the horizontal bandsaw machine 1. Therefore, in order to prevent the bandsaw blade 15 from being damaged by the material M being fed into the cutting position, the saw head assembly 5 is set to raise the bandsaw blade 15 a certain distance above the top surface of the material M to be cut.

Figure 2:
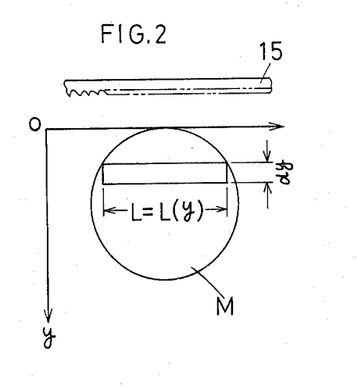
FIG. 2 is an illustration regarding the feeding of the bandsaw blade used in such horizontal bandsaw machines as shown in FIG. 1.

Referring now to FIG. 2, the feeding of the bandsaw blade 15 will be theoretically examined on the assumption that the bandsaw blade 15 is vertically fed into the material M to be cut with its cutting edge kept horizontal by the saw head assembly 5 which is moving along a vertical guide post or posts. In the graphic illustration of FIG. 2, it will be seen that the position y of the bandsaw blade 15 is lowered along the Y axis and the cross-sectional cut length L of the material M to be cut is changed along the X axis as the bandsaw blade 15 is lowered or fed to cut the material M. Thus, the cross-sectional cut length L at a time t after starting of a cutting cycle can be obtained as a function of the position of the bandsaw blade 15 namely L=L(y), if the shape and the dimensions of the material M to be cut are determined or specified.

Firstly, the cutting rate $\eta$ of the horizontal bandsaw machines is expressed as follows:

$$\text{Cutting Rate } (\eta) = \frac{\text{Cut Area (of the material } M \text{ to be cut)}}{\text{Time}} = \quad (1)$$

$$\frac{\text{Cross-sectional Cut Length } (L) \times \text{Feeding Amount}}{\text{Time}} =$$

Cross-sectional Cut Length (L) × Feeding Velocity (Vf)

Therefore, with the feeding or change amount and the time expressed as dy and dt, respectively, the cutting rate ($\eta$) is expressed as follows:

$$\text{Cutting Rate } (\eta) = L(y) \cdot \frac{dy}{dt} \quad (2)$$

$$\therefore L(y) \cdot dy = \eta \cdot dt \quad (3)$$

By integrating both members of the equation (3), the following equation is obtained:

$$\int L(y)dy = \eta t + C \quad (4)$$

where C is a constant of integration. Thus, when t=0, y=0, and the cut area $\int L(y)dt = 0$ $$\therefore 0 = \int L(y)dy = \eta \cdot 0 + C \therefore C = 0 \quad (5)$$

Therefore, the equation (4) is transformed as follows:

$$t = \frac{1}{\eta} \int L(y)dy \quad (6)$$

From the above, it will be understood that the cutting rate $\eta$ is maintained stated or constant by controlling the feeding velocity (dy/dt) or the position y of the bandsaw blade 15 so that the feeding velocity or the position of the bandsaw blade 15 satisfies the above equations (2) or (6), respectively. Thus, according to the present invention, the position or the feeding velocity of the bandsaw blade 15 is controlled in order to control the feeding of the bandsaw blade 15 and maintain the cutting rate stated or constant.

Figure 3:
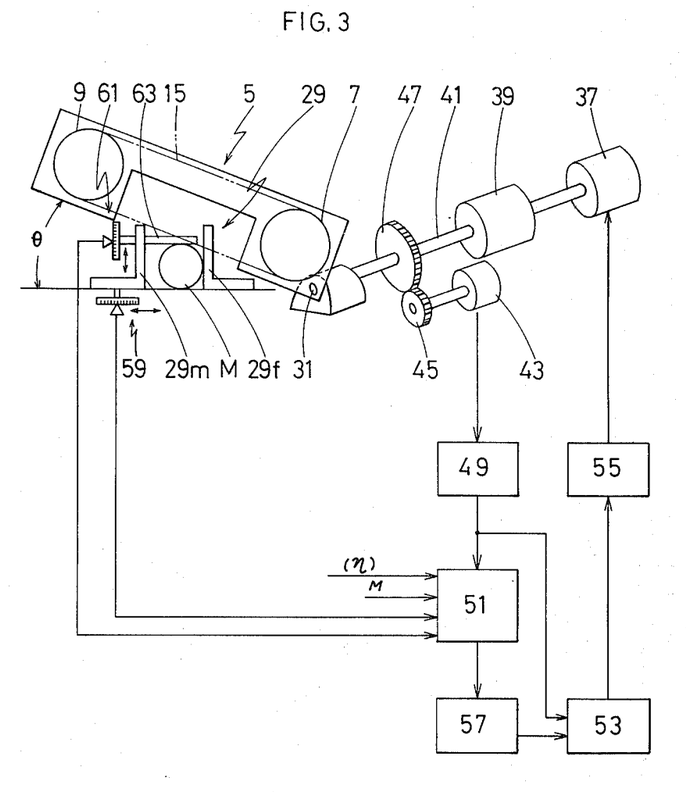
FIGS. 3, 4, 5 and 6 are diagrammatic views of the control system of horizontal bandsaw machines such as shown in FIG. 1 embodying the principles of the present invention.

Referring to FIG. 3, there is shown a first embodiment of the principles of the present invention in which the saw head assembly 5 is raised and lowered around a hinge pin 31 in the same manner as the horizontal bandsaw machine 1 shown in FIG. 1. However, the saw head assembly 5 in this first embodiment is markedly different from that shown in FIG. 1 in that it is raised and lowered by the hinge pin 31 itself which is so designed as to be driven by a driving motor 37 through a reduction gear unit 39 and a connecting shaft 41.

An angle detecting unit 43, such as a resolver or a pulse encoder is connected to the connecting shaft 41 by means of a gear 45 connected thereto and a gear 47 which is fixed to the connecting shaft 41 between the hinge pin 31 and the reduction gear unit 39. The angle detecting unit 43 is so arranged as to detect the angular position $\theta$ of the bandsaw blade 15 or the angle $\theta$ of the bandsaw blade 15 relative to the horizonal plane. The angular detecting unit 43 is connected to an actual angular position register 49 to give the angular position $\theta$ of the bandsaw blade 15 to the same. Also, the actual angular position register 49 is connected to a cross-sectional cut length computing processing unit 51 and a comparator 53 which is connected to a motor controlling unit 55 for controlling the motor 37.

The cross-sectional cut length computing processing unit 51 is connected to a desired angular position register 57 which is also connected to the comparator 53 to ultimately give to the comparator 53 the desired angular position of the bandsaw blade 15 at a slight interval dt for the desired cutting rate $\eta$ during a cutting cycle. Thus, the cross-sectional cut length computing processing unit 51 is so arranged as to firstly obtain the cross-sectional cut length L of the material M being cut and then obtain the desired angular position of the bandsaw blade 15 for the desired cutting rate $\eta$ based upon the firstly obtained cross-sectional cut length L of the material M. Therefore, data defining the desired cutting rates for various material to be cut is stored beforehand in the cross-sectional cut length computing processing unit 51 in order to obtain the desired angular position of the bandsaw blade 15 for the desired cutting rate $\eta$. Also, the cross-sectional cut length computing processing unit 51 is so arranged as to obtain the cross-sectional cut length L of the material M being cut according to the actual angular position $\theta$ of the bandsaw blade 15 given by the actual angular position register 49 and the cross-sectional shape and the dimensions of the material M being cut. Therefore, the cross-sectional shape such as round or square and the dimensions such as width and height or diameter of the material M to be cut is put into the memory of the cross-sectional cut length computing processing unit 51 before starting the cutting cycles. It will be readily understood that the cross-sectional cut length L of the material M to be cut is mathematically obtained according to the shape and the dimensions of the material M and the angular position of the bandsaw blade 15, since it is taken as a function $L(\theta)$ of the actual angular position $\theta$ of the bandsaw blade 15.

In this connection, the dimensions of the material M to be cut is automatically measured in each cutting operation by use of a work-width measuring means 59 and a work-height measuring means 61, for example linear inductosyns and magnetic scales as shown in FIG. 3 or other devices. The work-width measuring means 59 is so designed as to measure the width of the material M to be cut by measuring the distance between the inner surfaces of the fixed and movable jaws 29f and 29m of the vise assembly 29. Also, the work-height measuring means 61, which is provided with a measuring arm 63, is so arranged as to measure the height of the material M to be cut by measuring the distance between the bottom of the measuring arm 63 and the top surface of the work-table 27. However, of course, the dimensions of the material M to be cut can be manually put into the memory of the cross-sectional cut length computing processing unit 51 before starting the cutting cycles.

Referring again to the cross-sectional cut length computing processing unit 51, the desired angular position $\theta$ of the bandsaw blade 15 at a time t is obtained from the equation (2) ($\eta = L(y) \cdot dy/dt$) according to the cross-sectional cut length which is expressed as the function $L(\theta)$ of the actual angular position $\theta$ of the bandsaw blade 15. Assuming that the bandsaw blade 15 is fed into the material M being cut by a feeding amount $d\theta$ in a slight interval dt, namely, by a time (t+dt) after starting cutting at a time t and the cross-sectional cut length $L(\theta)$ of the material M is unchanged during the slight interval dt, the equation (2) ($\eta = L(y) \cdot dy/dt$) is replaced as follows:

$$\eta = L(\theta) \cdot d\theta/dt$$

$$\therefore dt = \frac{1}{\eta} \cdot L(\theta) \cdot d\theta$$

where it will be understood that $d\theta$ is the feeding amount of the bandsaw blade 15 in the slight interval dt.

According to the present invention, the actual angular position $\theta$ of the bandsaw blade 15 in the above equation ($dt = 1/\eta \cdot L(\theta) \cdot d\theta$) is detected by the angle detecting unit 43 and transmitted to the cross-sectional cut length computing unit 51 through the actual angular position register 49 as has been described hereinbefore. Also, the cross-sectional cut length $L(\theta)$ of the material M being cut is obtained by the cross-sectional cut length computing processing unit 51 according to the angular position $\theta$ of the bandsaw blade 15 and the shape and the dimensions of the material M, and the cutting rate $\eta$ in the above equation has been previously stored in the cross-sectional cut length computing processing unit 51. Thus, the cross-sectional cut length computing processing unit 51 is so arranged as to obtain the feeding amount $d\theta$ based upon the above equation and then obtain the angular position ($\theta + d\theta$) of the bandsaw blade 15 where the bandsaw blade 15 is to be at the time (t+dt) after starting cutting at a time t. In this arrangement, the cross-sectional cut length computing processing unit 51 is further so arranged as to transmit the angular position ($\theta + d\theta$) of the bandsaw blade 15 at a slight interval dt of time to the comparator 53 through the desired angular position register 57 during a cutting cycle.

The comparator 53 is so designed as to compare the values of the input given by the actual angular position register 49 with the desired angular position register 57 and transmit output signals according to the difference between these values to the motor controlling unit 55. Also, the motor controlling unit 55 is so arranged as to control the motor 37 according to the input given by the comparator 53 so that the difference between the values of the inputs given to the comparator 53 by the actual angular position register 49 and the desired angular position register 57 is kept zero to control the angular position of the bandsaw blade 15 under the control of the cross-sectional cut length computing processing unit 51.

As will be now understood, when the difference between the values of the inputs given by the actual angular position register 49 and the desired angular position register 57 is kept zero, the bandsaw blade 15 is fed into the material M being cut to satisfy the above described equation ($dt = 1/\eta \cdot L(\theta) \cdot d\theta$). Also, it will be understood that the bandsaw blade 15 is cutting an area $L(\theta) \cdot d\theta$ during a slight interval dt to perform cutting operation at a stated or constant cutting rate $\eta$ when fed in accordance with the equation ($dt = 1/\eta \cdot L(\theta) \cdot d\theta$).

In Summary, the cutting rate $\eta$ is kept stated or constant by controlling the angular position of the bandsaw blade 15 at a slight interval dt of time according to the desired cutting rates for materials to be cut which has been previously stored in the cross-sectional cut length computing processing unit 51. Initially, the actual angular position $\theta$ of the bandsaw blade 15 is transmitted by the angle detecting unit 43 via the actual angular position register 49 to the cross-sectional cut length computing processing unit 51 and the comparator 53. The cross-sectional cut length computing processing unit 51 firstly obtains the cross-sectional cut length of the material M being cut and then obtains the desired angular position of the bandsaw blade 15 during a slight interval dt according to the previously stored desired cutting rate and transmits the same to the comparator 53 through the desired angular position register 57. Then, the comparator 53 compares the value of the inputs given by the actual angular position register 49 and the desired angular position register 57 and transmits output signals according to the difference between these values to the motor controlling unit 55. Finally, the motor controlling unit 55 controls the motor 37 so that the difference between the values of the outputs of the actual and desired angular position registers 49 and 57 is kept zero so as to keep the cutting rate $\eta$ stated or constant.

Figure 4:
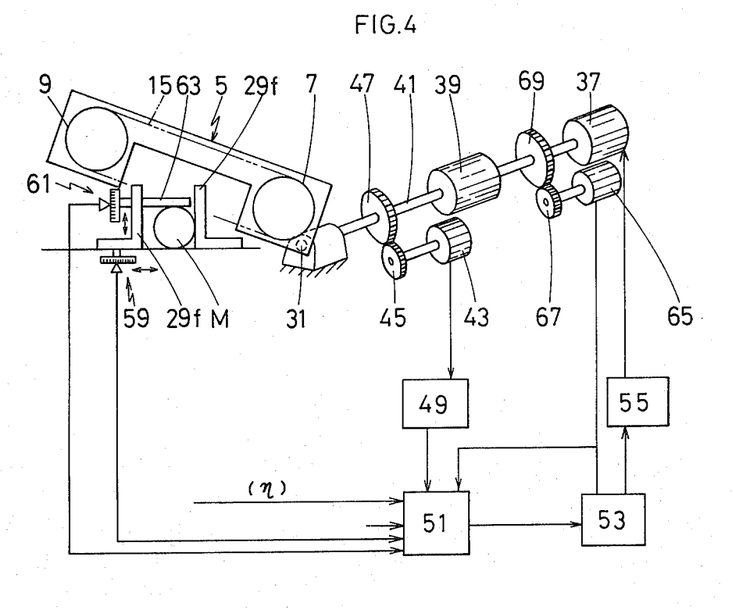

Referring to FIG. 4, there is shown a second embodiment of the principles of the present invention in which the saw head assembly 5 is raised and lowered by the hinge pin 31 in the same manner as the first embodiment shown in FIG. 3, although it is controlled in a different manner. Since this second embodiment is similar to the first embodiment, elements common to the first embodiment will be given the same reference numerals and will not be described in detail although, strictly speaking, some elements may be somewhat different in function.

The second embodiment is different from the first embodiment in that it shows a tachometer generator 65 which is connected between the motor 37 and the reduction gear unit 39 by means of gears 67 and 69, and feeds angular velocity signals to the cross-sectional cut length computing processing unit 51 and the comparator 53. That is, the tachometer generator 65 is so arranged as to detect the actual feeding angular velocity at which the hinge pin 31 is lowering the saw head assembly 5 to feed the bandsaw blade 15 into the material M being cut and then transmit the detected actual feeding angular velocity to the cross-sectional cut length computing processing unit 51 and the comparator 53. The actual angular position register 49 only feeds the angular position of the bandsaw blade 15 from the angle detecting unit 43 to the cross-sectional cut length computing processing unit 51, the cross-sectional cut length computing processing unit 51 being directly connected to the comparator 53.

The cross-sectional cut length computing processing unit 51 is so arranged as to obtain the cross-sectional cut length $L(\theta)$ of the material to be cut in the same manner as the first embodiment shown in FIG. 3. However, the cross-sectional cut length computing processing unit 51 is different from that in the first embodiment in that it is so arranged as to obtain the desired angular feeding velocity ($d\theta/dt$) of the bandsaw blade 15 and compare the obtained desired feeding velocity with the actual feeding velocity detected by the tachometer generator 65. The desired angular feeding velocity ($d\theta/dt$) is obtained according to the firstly obtained cross-sectional cut length $L(\theta)$ and the desired cutting rates $\eta$ previously stored in the same manner as hereinabove described in the first embodiment based upon the equation ($\eta = L(\theta) \cdot d\theta/dt$). Also, the cross-sectional cut length computing processing unit 51 is so arranged as to obtain the directional angular feeding velocity by comparing the obtained desired feeding velocity and the actual feedng velocity and then transmit the obtained directional angular feeding velocity to the comparator 53.

The comparator 53 is so arranged as to compare the directional angular feeding velocity given by the cross-sectional cut length computing processing unit 51 and the actual angular feeding velocity given by the tachometer generator 65 with each other and transmit output signals according to the difference between the two velocities to the motor controlling unit 55. Also, the motor controlling unit 55 is so arranged as to control the motor 37 so that the difference between the directional angular feeding velocity obtained by the cross-sectional cut length computing processing unit 51 and the actual angular feeding velocity detected by the tachometer generator 65 is kept zero.

As will be now apparent, when the difference between the directional angular feeding velocity obtained by the cross-sectional cut length computing processing unit 51 and the actual angular feeding velocity detected by the tachometer generator 65 is kept zero, the bandsaw blade 15 is fed into material M being cut at a stated or constant cutting rate in all the same manner as the first embodiment shown in FIG. 3. Thus, it will be understood that, in the second embodiment, the cutting rate is kept stated or constant by controlling the angular feeding velocity ($d\theta/dt$) of the bandsaw blade 15 at a slight interval dt of time during a cutting cycle.

Figure 5:
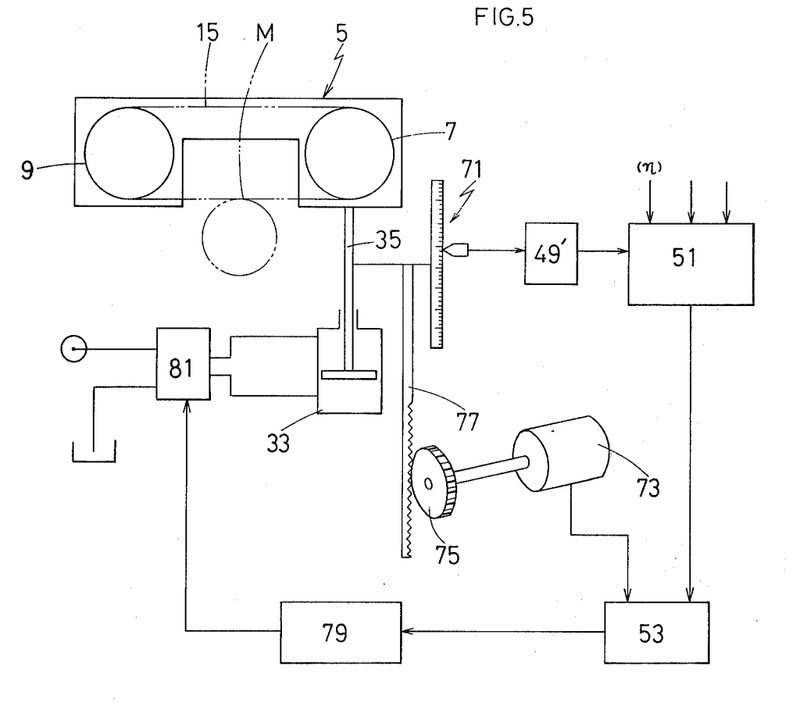

Referring to FIG. 5, there is shown a third embodiment of the principles of the present invention in which the saw head assembly 5 is so arranged as to be vertically raised and lowered along a vertical guide post or posts by the by means of the piston and rod 35. Since this third embodiment is also similar in principle to the first and second embodiments, common elements will be given the same reference numerals and will not be described in detail.

In this embodiment, a height detecting means 71, such as a magnet scale, is fixed to the piston and rod 35 of the hydraulic motor 33 or any other portion of the saw head assembly 5 so as to detect the vertical position or height of the bandsaw blade 15. The height detecting means 71 is connected through an actual height register 49' to the cross-sectional cut length computing processing unit 51 which is connected to the comparator 53.

More particularly, the height detecting means 71 is so arranged as to detect the height of the bandsaw blade 15 which is the vertical position thereof along the Y axis in FIG. 2 at a slight interval dt of time and to transmit the same to the cross-sectional cut length computing processing unit 51.

The cross-sectional cut length computing processing unit 51 is so arranged as to firstly obtain the cross-sectional cut length L(y) of the material M being cut and then obtain the desired feeding velocity of the bandsaw blade 15 according to the firstly obtained cross-sectional cut length L(y) and the stored desired cutting rate and based upon the equation (2) ($\eta = L(y) \cdot dy/dt$). The cross-sectional cut length L(y) of the material M being cut is obtained in the same manner as the first and second embodiments shown in FIGS. 3 and 4. Also, the cross-sectional cut length computing processing unit 51 is so arranged as to obtain the feeding or change amount dy of the vertical position y of the bandsaw blade 15 shown in FIG. 2 according to the input given by the height detecting means 71 and then obtain the actual feeding velocity (dy/dt) based upon the obtained change amount dy substantially in the same manner as the second embodiment. Furthermore, the cross-sectional cut length computing processing unit 51 is so arranged as to compare the desired feeding velocity and the actual feeding velocity and transmit the instructional feeding velocity to the comparator 53 according to the difference between the desired and actual feeding velocities in the same manner as in the second embodiment.

In order to detect the feeding velocity of the bandsaw blade 15, a tachometer generator 73 having a gear 75 is connected to a rack 77 which is vertically fixed to the piston and rod 35 of the hydraulic motor 33 or any other portion of the saw head assembly 5 in such a manner such that the gear 75 is in engagement with the rack 77. The tachometer generator 73 is connected to the comparator 53 so as to transmit the actual feeding velocity of the bandsaw blade 15 to the comparator 53.

The comparator 53 is connected to a valve controlling means 79 for controlling a servo valve 81 which is connected to the hydraulic motor 33 for raising and lowering the saw head assembly 5 to control the feeding velocity of the bandsaw blade 15. Thus, the comparator 53 is so arranged as to compare the input signals given by the cross-sectional cut length computing processing unit 51 and the feeding velocity transmitted by the tachometer generator 73. The signal at the output of the comparator 53 is fed to the servo valve 81 by means of the valve controlling means 79 in order to control the feeding velocity of the bandsaw blade 15.

As will be apparent from the above description, the feeding velocity of the bandsaw blade 15 is controlled in the third embodiment by controlling the hydraulic motor 33 for raising and lowering the saw head assembly 5 to keep the cutting rate stated or constant. Also, it will be understood that the feeding velocity of the bandsaw blade 15 is controlled at a slight interval of time to keep the cutting rate stated or constant substantially in the same manner as the second embodiment, although the bandsaw blade 15 is fed in the manner different from the second embodiment.

In this connection, it is readily apparent to those skilled in the art that the height detecting means 71 and the tachometer generator 73 in the third embodiment can be replaced by suitable means for the horizontal bandsaw machine in which the saw head assembly 5 is raised and lowered around the hinge pin 31 as shown in FIG. 1. Also, it will be understood that elements in the third embodiment can be replaced by elements substantially similar to those in the first and second embodiments and vice versa by those skilled in the art.

Figure 6:
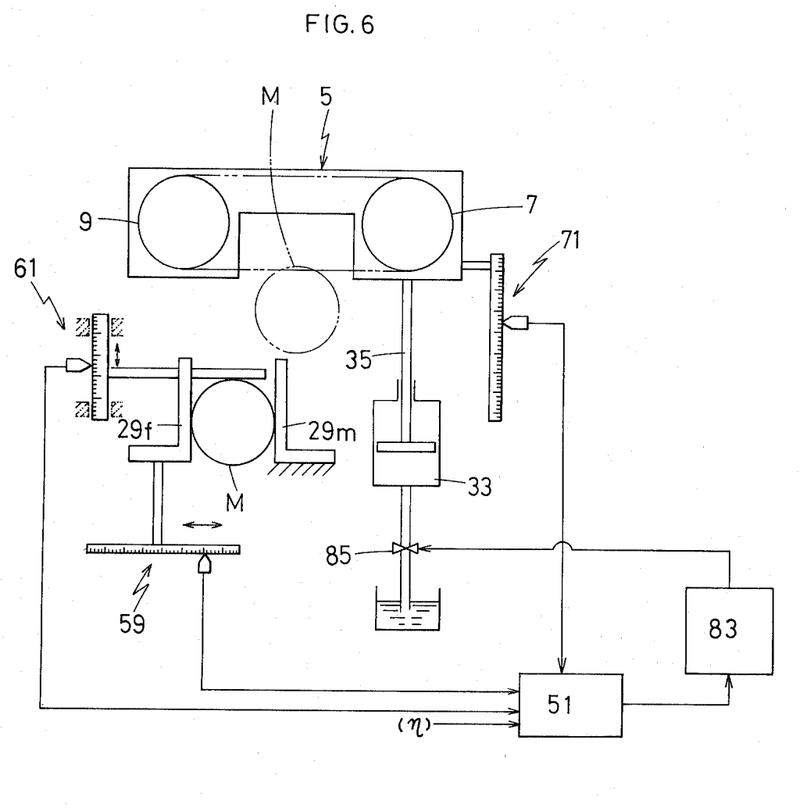

Referring to FIG. 6, there is shown a fourth embodiment which can be incorporated into the preceding embodiments to control the feeding of the bandsaw blade 15 so that the bandsaw blade 15 is brought into contact with the material M to be cut in the shortest idle time possible and then fed at a constant optimum cutting rate.

In this embodiment, a sequence controlling circuit 83 is connected between the cross-sectional cut length computing processing unit 51 and the means for controlling the feeding of the bandsaw blade 15 which is shown in FIG. 6 as a flow control valve 85 which controls the hydraulic motor 33 for raising and lowering the saw head assembly 5. In the same manner as described in the preceding embodiments, the cross-sectional cut length computing processing unit 51, which contains previously stored data defining the shape and the dimensions of the material M to be cut and the desired cutting rate $\eta$ for materials to be cut, is connected to the height detecting means 71 which detects the vertical position of the bandsaw blade 15. The cross-sectional cut length computing processing unit 51 is so arranged as to obtain the positional relationship of the material M to be cut and the bandsaw blade 15 according to the shape and the dimensions of the material M and the vertical position of the bandsaw blade 15. Also, the sequence controlling circuit 83 is so arranged as to control the feeding velocity of position of the bandsaw blade 15 so that bandsaw blade 15 is brought into contact with the material M to be cut in the shortest time and then fed into the material M at a constant optimum cutting rate.

Of course, the feeding of the bandsaw blade 15 is controlled in the above described manner by the sequence controlling circuit 83 which controls the flow control valve 85, which in turn controls the hydraulic motor 33 that raises and lowers the saw head assembly 5.

It will be readily understood that the principles of the fourth embodiment shown in FIG. 6 can be incorporated into any of the preceding embodiments shown in FIGS. 3, 4 and 5. Thus, according to the present invention, the bandsaw blade 15 is controlled in any of the preceding embodiments so that it is quickly brought into contact with the material M to be cut in the shortest idle time possible and then fed into the same at a constant optimum cutting rate.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A method for controlling the cutting rate of a blade of a bandsaw machine, said method comprising the steps of:
   (a) driving a bandsaw blade;
   (b) positively feeding the bandsaw blade into a material to be cut;
   (c) detecting the feeding position of the bandsaw blade in a material to be cut;

(d) generating first signals from the detected feeding position, said first signals defining the detected feeding position;

(e) generating second signals defining the length of the cross-sectional cut in the material at a time corresponding to the feeding position as defined by said first signals; and (f) controlling the feeding of the bandsaw blade into the material to be cut as a function of the length of the cross-sectional cut defined by said second signals and maintaining a constant cutting rate.

2. The method as claimed in claim 1 including the steps of:

(a) detecting the height of the material to be cut; and (b) feeding the bandsaw blade from a raised position to a lowered position in contact with the material to be cut in response to said detected height at a rate which is greater than the feeding rate.

3. An apparatus for controlling the cutting rate of a blade of a bandsaw machine, said apparatus comprising:

(a) means for driving the bandsaw blade;

(b) means for positively feeding the bandsaw blade into a material to be cut;

(c) detector means for detecting the feeding position of the blade in a material to be cut and generating first signals defining said detected feeding position;

(d) signal processing means connected to said detecting means for generating second signals defining the length of the cross-sectional cut in the material at a time corresponding to the feeding position as defined by said first signals; and (e) a controller responsive to said second signals for feeding the blade at a selected rate and maintaining a constant cutting rate.

4. The apparatus as claimed in claim 3 including:

(a) height detector means connected to said processing means for detecting the height of a material to be cut; and (b) sequence means connected to said processing means for controlling said feeding means to rapidly feed the blade from an upper position out of contact with the material to be cut to a lower position in contact with the material to be cut prior to cutting of the material, the rate at which said blade is fed from said upper position to said lower position being greater than the feeding rate during cutting.

* * * * *